United States Patent [19]

Boje et al.

[11] 4,305,573
[45] Dec. 15, 1981

[54] FLAME CUTTING MACHINE CONTROL SYSTEM

[75] Inventors: Jurgen Boje, Frankfurt am Main; Heinz Gewald, Neu-Isenburg; Gunter Schumann, Rodermark; Horst Bratengeier, Neu-Isenburg; Eckhard Koch, Frankfurt am Main, all of Fed. Rep. of Germany

[73] Assignee: Messer Griesheim GmbH, Frankfurt am Main, Fed. Rep. of Germany

[21] Appl. No.: 121,801

[22] Filed: Feb. 15, 1980

Related U.S. Application Data

[63] Continuation-in-part of Ser. No. 941,644, Sep. 12, 1978, abandoned.

[30] Foreign Application Priority Data

Sep. 15, 1977 [DE] Fed. Rep. of Germany ....... 2741470

[51] Int. Cl.³ .............................................. B23K 7/10
[52] U.S. Cl. ...................................... 266/60; 266/58; 266/69
[58] Field of Search ............. 200/296, 302; 174/52 R, 174/66, 67; 361/331, 332, 334, 340, 346-351, 358-360, 391, 393-395; 266/48, 58, 59, 60, 61, 62, 63, 67, 68, 69

[56] References Cited

U.S. PATENT DOCUMENTS

| | | | |
|---|---|---|---|
| 2,128,647 | 8/1938 | Johansson | 361/360 |
| 2,130,250 | 9/1938 | Reed | 361/340 |
| 2,566,064 | 8/1951 | Keim | 174/52 R |
| 2,885,600 | 5/1959 | Wiseman | 361/346 |
| 3,009,023 | 11/1961 | Ruth | 174/52 R |
| 3,140,344 | 7/1964 | Slater et al. | 174/67 |
| 4,121,808 | 10/1978 | Cardea | 266/69 |
| 4,168,056 | 9/1979 | Haley | 266/58 |
| 4,177,497 | 12/1979 | McCook et al. | 361/331 |

FOREIGN PATENT DOCUMENTS

| | | |
|---|---|---|
| 2260064 | 3/1975 | Fed. Rep. of Germany . |
| 2546176 | 4/1977 | Fed. Rep. of Germany ...... 361/331 |

Primary Examiner—L. Dewayne Rutledge
Assistant Examiner—John P. Sheehan
Attorney, Agent, or Firm—Connolly and Hutz

[57] ABSTRACT

A flame cutting machine control system has a housing to hold the control units with a front plate for the housing; the control units are attached to the front plate with the front plate being designed as a housing cover and the control units being insertable into the housing.

9 Claims, 4 Drawing Figures

FLAME CUTTING MACHINE CONTROL SYSTEM

CROSS-REFERENCE TO RELATED APPLICATION

This application is a continuation-in-part of copending application Ser. No. 941,644 filed Sept. 12, 1978 abandoned.

BACKGROUND OF INVENTION

The present invention relates to a control for machine tools, especially flame cutting machines with a housing to hold the control units of the control system, as well as a front plate of the housing.

With this concept in mind, the invention is particularly related to control systems as they have been known up to now, especially flame cutting machines, which are, for example, marketed under the Multisec label. With the known control systems, the individual control units are attached in a housing box, whereby the side walls and the back wall of the housing serve as fastening and support plates. Wires lead from these control units to adjusting instruments, switches and reading instruments which are fastened to a housing cover. A front plate, which is provided with appropriate symbols for the switches, operating elements and indicating instruments is mounted on the housing cover. In addition to the time consuming and related costly wiring, a disadvantage of such control system construction is the expenditure brought about, especially in connection with servicing, during testing, measuring and the exchange of individual control units within the housing.

SUMMARY OF INVENTION

It is an object of this present invention to avoid the above disadvantages and to create a control with which, especially, the control units are able to be mounted and serviced in a most simple manner.

To accomplish this object it is suggested, according to the invention, that all control units be fastened to the front plate of the housing, that moreover, the front plate be designed as a housing cover and that the front plate with the control units is insertable into the housing.

An easy accessability to all control units of the complete control system is achieved by the design of the invention. This is of special advantage especially during servicing, as well as testing and measurement of the individual control unit. Furthermore, the invention makes possible an easy exchangeability of the complete control system, so that, in case of serious disturbances, the complete front plate with the control units can be exchanged with a new, correspondingly designed plate with control units.

The invention, moreover, makes possible a premounting of the front plate and the control units, whereby complete assembly parts can be preassembled and tested. It is of further advantage, that by the exchange of the front plates with the control unit with another front plate with other control units, while retaining the basic housing, the control can be simplified or can be expanded for new control functions. Corresponding work on the housing or additional mounting within the housing are not necessary. This is of special advantage, in view of the total concept of the machine tool, because it has become possible to provide a basic housing onto the cross arm of a flame cutting machine which can be equipped with variously designed front plate with corresponding control units. Furthermore, it is an essential advantage of the invention, that now, wiring work within the housing is avoided almost completely, except for the above mentioned raceways and terminals of the housing.

THE DRAWINGS

DETAILED DESCRIPTION

Figure 1:
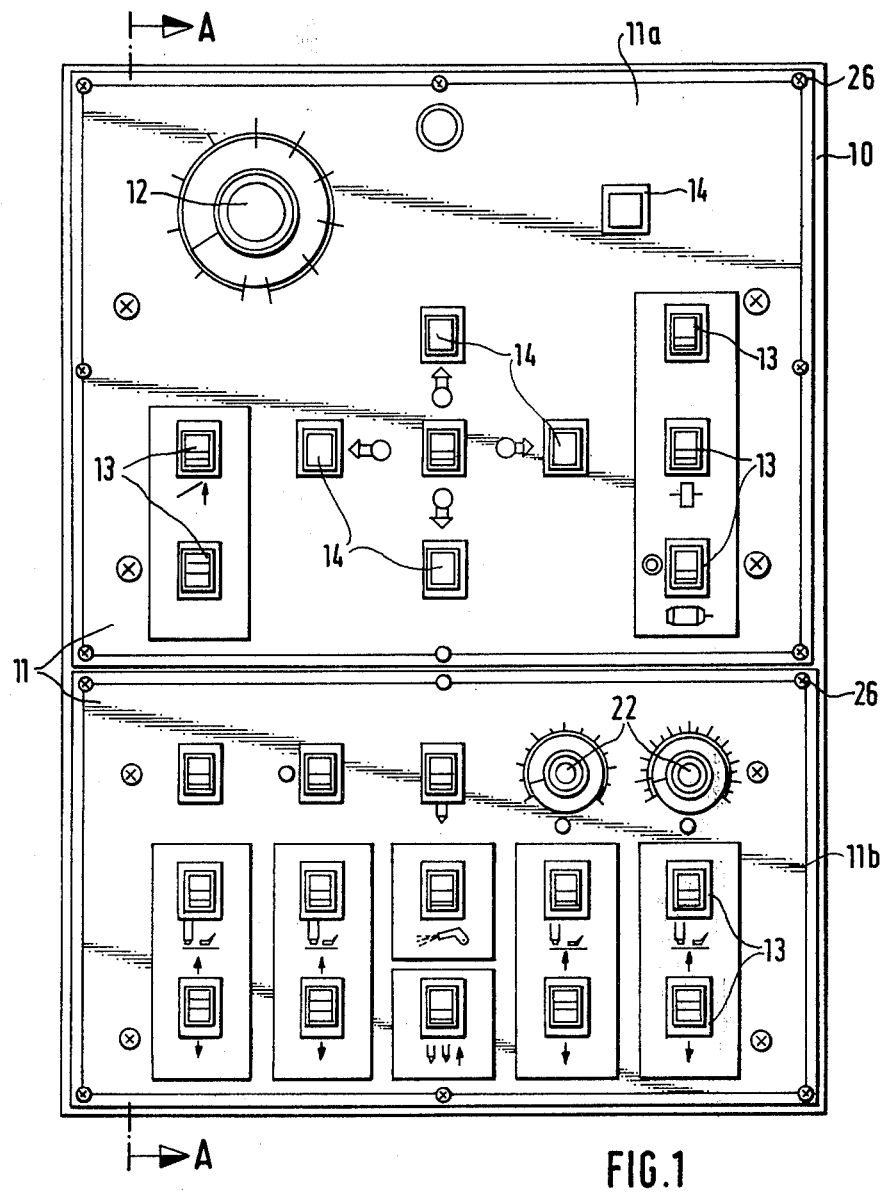
FIG. 1 is a control system according to the invention in front view.

In FIG. 1 the housing for holding the control units for a control system of machine tools is, in its entirety, marked 10. The housing 10 has a front plate 11, which in the example of embodiment is designed in two parts (11a, 11b). On the front plate 11 are arranged the respective operating elements, such as knobs 12, toggle switches 13, and push buttons 14, symbols and control values. As especially seen from FIGS. 2 and 3, according to the invention control units for controls designated by 15 and 16 are fastened to front plate 11. The control units, thereby, are designed as supports for printed circuit boards with corresponding printed circuits, whereby the support bolts are connected to the front plate. Said operating elements 12 to 14 are also fastened to the front plate and are wired to printed circuits 17 and/or 18. Moreover, as FIGS. 2 and 3 indicate, the front plate 11a/11b is designed as a housing cover and, moreover, the front plate control units are insertable into the housing 10. The terminals of the control are fastened to the housing back wall 19 and are marked 20.

The housing 10 is preferably designed as a box 21 enclosed on five sides. A swiveling frame 23 is attached by means of hinges 22 or the like to box 21, which spans box opening 24. The swiveling frame, thereby, is preferably made of a U-profile, which serves to hold a dust seal 25 in the form of a circular gasket. The front plate is designed so as to fit dust-tight against walls 21 the housing forming the opening 24 so that no dirt can reach the interior of the housing in the area of the control unit. Dust-proofing is achieved by known sealing agents such as adhesive tapes as well as foam rubber profiles or the like.

Figure 2:
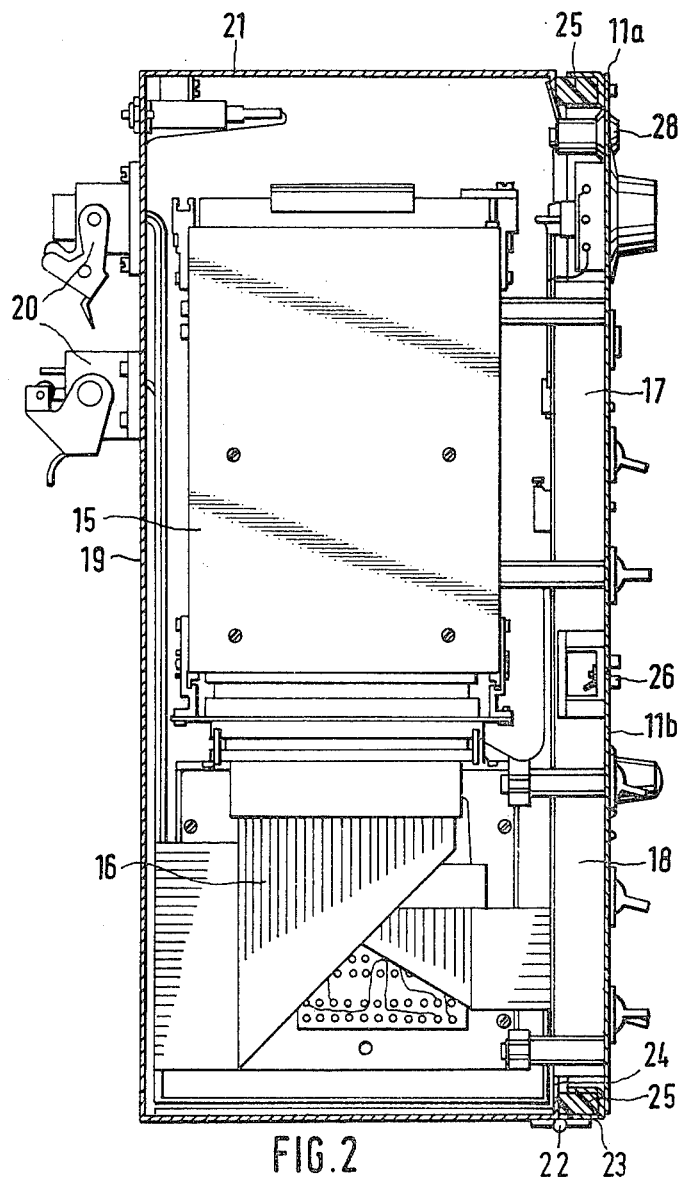
FIG. 2 is a longitudinal view through the control system according to FIG. 1 along line A—A.

As seen from FIG. 2, the front plate 11a as well as the front plate 11b with the respective control units 15, 16 are fastened detachably to the swiveling frame by means of screws 26. Preferably, the swiveling frame 23 is thereby provided with a cross arm 27. A lock 28 (see FIG. 2) is fastened to the front plate to hold the swiveling frame to the housing box.

Figure 3:
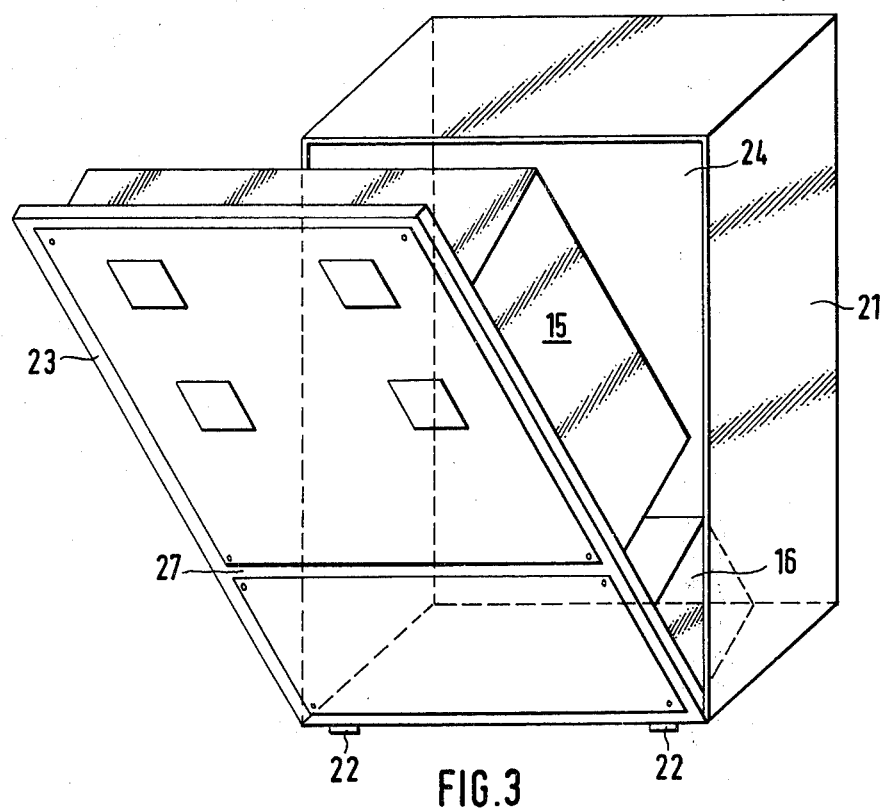
FIG. 3 is a schematic, perspective representation of the housing of the control system according to the invention.

As especially shown by FIG. 3, an almost optimal accessability of the control units is achieved by a simple swinging out of the swiveling frame 23, which is of special advantage especially in servicing. It is, moreover, of advantage that the front plate and control units 11a/15 and/or 11b/16 can be preassembled as components, and during the final mounting, only need to be placed into the housing and fastened to the swiveling frame. Thus, the invention has brought about a control system by which, through the arrangement of the control units of the invention in relation to the front plate, an especially simple and easy to handle control design is obtained.

Figure 4:
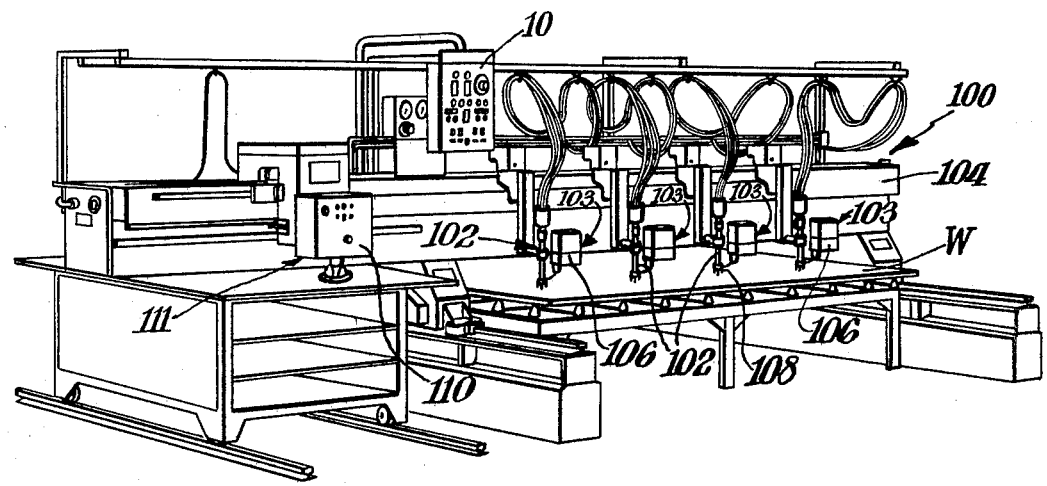
FIG. 4 schematically illustrates a flame cutting machine incorporating the control system of FIGS. 1-3.

FIG. 4 shows a flame cutting machine 100 incorporating the control system of this invention. The illustrated flame cutting machine 100 is of the type marketed under the name Multisec. Such Multisec machine is described in greater detail in German Pat. No. 22 60 064 and in Messer Griesheim publications 10.4301 entitled "MULTISEC(DBP)" and Einsatz einer neuzeitlichen, etc. No. 4, June 1964, the details of which are incorporated herein by reference thereto. Flame cutting machine 100 includes a plurality of cutters 102 mounted to cross arm 104 for cutting the workpiece W. Each cutter is provided with its control system in housing 103 and includes, for example, sensor 106 for the electro-automatic height of its cutting torch as well as sensor 108 for the height adjustment of the torch.

The housing for holding the control units for the control system of machine tool is marked in FIG. 4 also with 10. Furthermore it is possible to design the housing 103 of the electro-automatic height control 106/108 and also the housing 110 of the photoelectric control as well as the housing 10 in the manner previously described.

What is claimed is:

1. In a flame cutting machine having a control system, said flame cutting machine having a cross arm, said control system including a housing on said machine cross arm, said housing holding the control units for said flame cutting machine, a front plate mounted to said housing, the improvement being all of said control units being attached to said front plate of said housing, said front plate being designed as a housing openable cover, said openable cover being mounted so as when closed to fit dust-tight against said housing so that no dirt can reach the area of said control units, and said control units being insertable into said housing while attached to said front plate.

2. The combination according to claim 1, characterized therein that said housing consists of a housing box enclosed on five sides with its sixth side open, said front plate including a swiveling frame spanning said open side, and said frame being hinged to said box.

3. The combination according to claim 2, characterized therein that said front plate is fastened detachably to said swiveling frame whereby said plate and said control units may be replaced by a different plate having different control units.

4. The combination according to claim 3, characterized therein that said swiveling frame is provided with a cross arm, said front plate comprising a pair of partial front covers, and said partial front covers being fastened to said cross arm.

5. The combination according to claim 2, characterized therein that said swiveling frame is provided with a cross arm, said front plate comprising a pair of partial front covers, and said partial front covers being fastened to said cross arm.

6. The combination according to claim 5, characterized therein that said front plate comprises a rectangular frame having a cross arm spanning opposite sides of said frame to create a pair of open sections in said frame, a pair of panels detachably secured to said frame with each of said panels closing a respective one of said open sections, and said control units being mounted to said panels whereby selective control units may be replaced by detaching a respective panel and replacing the panel with a different panel having other control units secured thereto.

7. In a flame cutting machine having a control system, the control system having control units for controlling the operation and servicing of the machine and the control system further having a housing in which the control units are mounted and the housing having a front plate mounted thereto, the improvement being said housing comprising five sides and an open sixth side, said plate being hinged to said housing at said open sixth side to function as a cover for said housing an provide selective access to the interior of said housing and selective opening and closing of said sixth side, said plate comprising a peripheral frame, a cross arm extending across said frame to divide said frame into a pair of open sections, a pair of partial front covers detachably secured to said frame closing said pair of open sections, and all of said control units in said housing being secured to said partial front covers whereby the opening of said plate provides access to said control units.

8. The combination according to claim 2, characterized therein that said frame is hinged to said box for rotation downwardly to open said sixth side.

9. The combination according to claim 3, characterized therein that sealing means are provided for said frame to provide a dust-tight fit of said frame to said box.

* * * * *